(No Model.)
C. H. CHUNN.
PROTRACTOR.
No. 526,023. Patented Sept. 18, 1894.
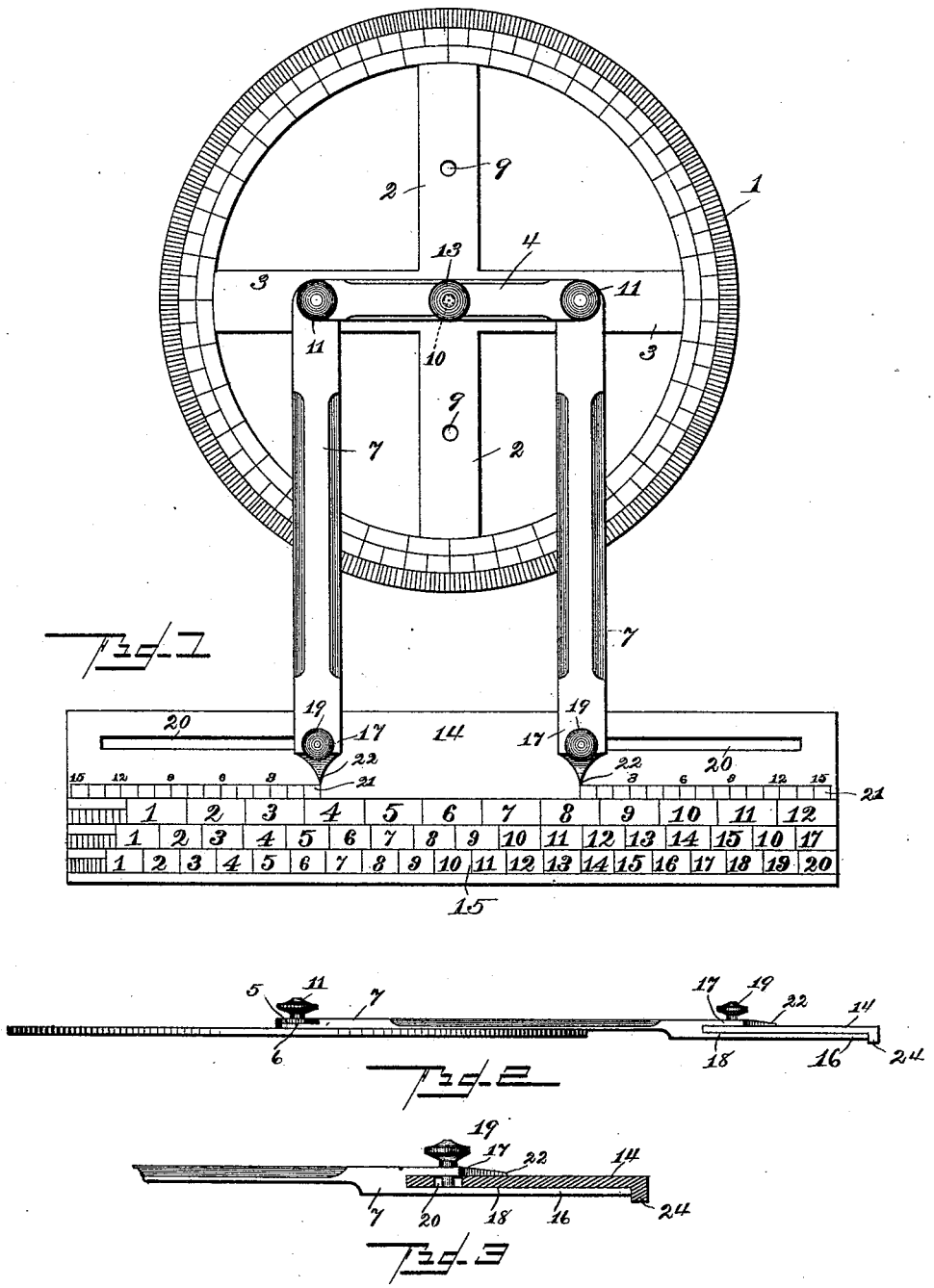
Witnesses
G. Thyerz
J. M. Witherow
Inventor
C. H. Chunn
By Joseph L. Atkins
Attorney

UNITED STATES PATENT OFFICE.

CHARLES HAMILTON CHUNN, OF ASHEVILLE, NORTH CAROLINA, ASSIGNOR OF ONE-HALF TO EMMA E. COWAN, OF SAME PLACE.

PROTRACTOR.

SPECIFICATION forming part of Letters Patent No. 526,023, dated September 18, 1894.

Application filed September 29, 1893. Serial No. 486,819. (No model.)

*To all whom it may concern:*

Be it known that I, CHARLES HAMILTON CHUNN, of Asheville, county of Buncombe, State of North Carolina, have invented certain new and useful Improvements in Protractors, of which the following is a specification, reference being had to the accompanying drawings.

The object of my invention is to produce a completely circular protractor having its parts constructed and arranged so as to admit of the use of the entire circle in conjunction with a T-square.

In the accompanying drawings: Figure 1 is a plan view of my protractor. Fig. 2 is an edge-wise view of the protractor, showing the arrangement of the connecting bar and gage bars. Fig. 3 is a side elevation of a section of one of the gage bars and guide plate.

Referring to the figures on the drawings: 1 indicates a protractor preferably made completely circular instead of semi-circular as usual. It is preferably provided with diametrical cross pieces 2 and 3, arranged at right angles to each other.

4 indicates a connecting bar having recesses 5 at its opposite ends with which similarly recessed ends 6, of gage bars 7, form hinge joints.

9 indicates apertures in each of the cross pieces and 10 a central aperture. Each pair of apertures 9 are designed to receive compression thumb-screws 11 to secure the hinge joints immovably in any desired position. The aperture 10 is designed to receive a third thumb screw 13.

The apertures 9 and 10 may be screw-threaded to directly receive the threads of the thumb screws, or, if preferred, separate nuts (not illustrated) may be provided for them.

The object of providing four apertures 9 is to render it possible to adjust the zero line of the protractor in line with or at right angles to the connecting bar 4.

14 indicates a scale or guide plate preferably inscribed, as usual, with suitable scale measures, as indicated at 15. It is attached to the gage bars preferably by the mechanism illustrated; that is to say, the end of each gage bar is provided with a lower projecting leg 16 and an upper shorter leg 17, the two being separated by a recess 18 of about the thickness of the scale plate. A thumb screw 19, passing through the leg 17 and screwing into the leg 16, works in a slot 20, one of which is provided at each end of the scale plate for the accommodation of each of the gage bars. By this mechanism, when the thumb screw is unscrewed, the gage bars may be adjusted upon the scale plate, as desired, when, by turning the screws in the opposite direction, the scale plate may be securely compressed and fastened between the legs of the gage bars.

The object of the adjustment of the gage bars is to render possible the exposure of all the degree marks of the protractor, which might otherwise be covered and rendered useless. It is necessary also to keep the protractor true with the scale plate and therefore to secure equal adjustments of the gage bars. For this purpose I prefer to employ graduated scales 21 below the slots 20 and provide pointers 22 on the ends of the legs 17 of the gage bars. The scales are graduated in opposite directions so that it is convenient to set the gage bars by them, as required.

Upon the edge of the scale plate that, in practice, works against the T-square, I prefer to employ a downwardly projecting flange 24, extending below the lower surface of the leg 16. By this means, I provide for the convenient movement of the gage bars without rubbing the paper underneath it.

What I claim is—

1. The combination with a circular protractor, of gage bars provided with indicating point, and a graduated guide plate movably secured to said gage bars, substantially as specified.

2. The combination with a circular protractor, of a guide plate, gage bars having pivotal connections with the protractor and guide plate, respectively, and means of laterally adjusting the pivotal connections between the gage bars and the guide plate, substantially as specified.

3. The combination with a circular protractor, of a guide plate, gage bars having pivotal connections with the protractor and guide plate, and means for adjusting said pivotal connections upon the protractor and guide plate, substantially as specified.

4. The combination with a protractor and gage bars, of a guide plate, and a flange on the edge of the guide plate extending slightly beyond the surface of the gage bars, substantially as and for the purposes specified.

5. The combination with a circular protractor having diametrical cross pieces provided with apertures, connecting bar and thumb screws, gage bars movably secured to the connecting bar and a graduated guide plate adjustably connected with the gage bars, substantially as specified.

6. The combination with a circular protractor, of a graduated guide plate provided with slots, gage bars movably secured to said protractor, and pivots connecting the gage bars with the guide plate and laterally adjustable within the slots, substantially as specified.

In testimony of all which I have hereunto subscribed my name.

CHARLES HAMILTON CHUNN.

Witnesses:
C. F. RAY,
H. E. FULENWIDAR.